(12) United States Patent
Gilton et al.

(10) Patent No.: US 11,437,687 B2
(45) Date of Patent: Sep. 6, 2022

(54) POWER UNIT MADE UP OF A WELD-FREE ASSEMBLY OF A PLURALITY OF BATTERY CELLS

(71) Applicant: Pymco Technologies, Paris (FR)

(72) Inventors: Pierre-Yves Gilton, Paris (FR); Marc Nguyen, Paris (FR)

(73) Assignee: Pymco Technologies, Paris (FR)

( * ) Notice: Subject to any disclaimer, the term of this patent is extended or adjusted under 35 U.S.C. 154(b) by 0 days.

(21) Appl. No.: 16/764,760

(22) PCT Filed: Nov. 9, 2018

(86) PCT No.: PCT/FR2018/052795
§ 371 (c)(1),
(2) Date: May 15, 2020

(87) PCT Pub. No.: WO2019/097146
PCT Pub. Date: May 23, 2019

(65) Prior Publication Data
US 2020/0365864 A1     Nov. 19, 2020

(30) Foreign Application Priority Data

Nov. 15, 2017 (FR) ...................................... 1760750

(51) Int. Cl.
*H01M 50/502* (2021.01)
*H01M 50/213* (2021.01)
*H01M 50/572* (2021.01)

(52) U.S. Cl.
CPC ....... *H01M 50/502* (2021.01); *H01M 50/213* (2021.01); *H01M 50/572* (2021.01); *H01M 2200/103* (2013.01)

(58) Field of Classification Search
None
See application file for complete search history.

(56) References Cited

U.S. PATENT DOCUMENTS

| 5,096,788 A | 3/1992 | Bresin et al. |
| 2015/0364744 A1* | 12/2015 | Takano ............... H01M 50/572 |
| | | 429/61 |

(Continued)

FOREIGN PATENT DOCUMENTS

| EP | 1450422 A1 | 8/2004 |
| EP | 2034539 A1 | 3/2009 |

(Continued)

OTHER PUBLICATIONS

International Search Report for International Application No. PCT/FR2018/052795, dated Feb. 20, 2019, 3 pages.

(Continued)

*Primary Examiner* — Wyatt P Mcconnell
(74) *Attorney, Agent, or Firm* — TraskBritt (57) ABSTRACT

A power unit made up of a weld-free assembly of a plurality of battery cells having positive and negative contact surfaces, respectively, on the two opposing front ends thereof, the cells being mechanically juxtaposed and parallel with one another, the unit including: a bottom plate having metal contact zones capable of ensuring electrical and optionally thermal connection with the bottom metal base of a cell; a top plate having metal contact zones for ensuring electrical connection with the top cap of a cell; means for connecting with the top caps of the cells, which are resiliently deformable in an axial direction relative to the orientation of the cells.

20 Claims, 4 Drawing Sheets

(56) References Cited

U.S. PATENT DOCUMENTS

2016/0322671 A1* 11/2016 Wieners .............. H01M 10/425
2017/0229208 A1   8/2017 Kovent
2017/0365888 A1* 12/2017 Kwon ............... H01M 10/4207

FOREIGN PATENT DOCUMENTS

| EP | 2416405 A1 | 2/2012 |
| EP | 2697846 A2 | 2/2014 |
| EP | 2008354 | 10/2016 |
| WO | 2012/139839 | 10/2012 |

OTHER PUBLICATIONS

International Written Opinion for International Application No. PCT/FR2018/052795, dated Feb. 20, 2019, 10 pages.
European Communication pursuant to Article 94(3) EPC for European Application No. 18827153, dated Jun. 29, 2021, 4 pages.

* cited by examiner

POWER UNIT MADE UP OF A WELD-FREE ASSEMBLY OF A PLURALITY OF BATTERY CELLS

CROSS-REFERENCE TO RELATED APPLICATIONS

This application is a national phase entry under 35 U.S.C. § 371 of International Patent Application PCT/FR2018/052795, filed Nov. 9, 2018, designating the United States of America and published as International Patent Publication WO 2019/097146 A1 on May 23, 2019, which claims the benefit under Article 8 of the Patent Cooperation Treaty to French Patent Application Serial No. 17/60750, filed Nov. 15, 2017.

TECHNICAL FIELD

The present disclosure relates to the field of power units made up of an assembly of a plurality of battery cells connected to each other weldlessly.

BACKGROUND

The cells have, at one of the end faces, a cylindrical protuberance with a flat conductive bottom with a cross-section smaller than the cross-section of the cell, generally corresponding to the positive pole, and, at the opposite end, a flat conductive bottom bounded by the protective casing, the cross-section of which is very slightly smaller than the external cross-section of the cell and noticeably larger than the above-mentioned cylindrical protuberance.

This zone generally constitutes the negative pole. This type of cell is known by the ancestral name "Leclanché cell."

The cells are typically rechargeable batteries whose dimensions are generally standardized, for example, RC6 cells, according to the IEC (International Electrotechnical Commission) codification, with a length of 50 millimeters and a diameter of 14.2 millimeters, or 18650 cells with a length of 65 millimeters and a diameter of 18 millimeters. Of course, the disclosure is not limited to a particular type of cells.

The current prior art of batteries considers cylindrical cells to be the best compromise between energy performance and power. Their mass production also gives them the lowest specific cost among the current battery formats.

However, their low unit energy content requires large and costly assemblies.

In addition, these assemblies are often the source of performance limitations due to their non-ideal electrical and thermal contact.

A simple, easy to implement, inexpensive assembly, as well as electrical and thermal performance, therefore represents an essential part of the electric power train.

Today's batteries are made up of a large number of cells (sometimes in the order of a hundred or even several thousand), electrically connected to each other by contacts formed by conductive strips welded to the terminals of the cells, which are separated by insulators and assembled in the form of a pack by means of adhesive tape. The production of such batteries requires tedious, time-consuming and costly assembly.

Furthermore, they do not allow the replacement of one or more cells that might prove to be defective, by after-sales or maintenance services.

More recently, solutions have been proposed that consist of connecting the battery cells mechanically and electrically by means of two flat elements or plates that come into electrical and mechanical contact, respectively, with one and the other of the ends of the cells.

These plates have conductive tracks, usually made of copper, and are then connected by mechanical connection elements, such as spacers, that ensure clamping to hold the resulting unit together.

European Patent No. EP 2034539 is known in the prior art and describes a power unit solution consisting of a plurality of juxtaposed cylindrical or prismatic cells, connected to each other weldlessly and housed in through slots of a positioner and separator compartment, characterized in that the positioner and separator compartment is disposed between two maintaining and contact panels comprising a framework and whose internal faces are equipped with one or more contact strip(s) fixed, weldlessly, against the faces and each ensuring the electrical interconnection of a plurality of cells, that is to say a number of cells greater than two, the contact strip or each of the contact strips being made of a flexible conductive material and comprising a plurality of flexible contact tongues cut out of the contact strip or each of the contact strips and attached thereto, these contact tongues being held flat against the terminals of the cells, by individual resilient pressure means distributed on the inner face of the contact and holding panels, the panels being fixed by screwing on the large opposite faces of the separator and positioner compartment, so that the contact tongues equipping the inner face of the panels are individually pressed against one of the terminals or positive or negative poles constituting the opposite ends of the cells.

U.S. Pat. No. 5,096,788 describes another example of a weld-free battery pack including:
  a housing with a cover;
  a plurality of cells positioned in a pair of top and bottom alignment plates and housed in the housing, each cell having a positive terminal and a negative terminal;
  a flexible circuit made up of a single conductive sheet providing the interconnection between the plurality of cells;
  a first pressure member disposed between the inner surface of the bottom of the housing and a portion of the flexible conductive sheet; and a second pressure member disposed between the cover and another portion of the flexible conductive sheet, each of the first and second pressure members being provided with resilient fingers, the resilient fingers being inclined toward the positive and negative terminals so as to press the opposite portions of the conductive sheet against the terminals and provide the interconnection of the plurality of cells.

This solution is not satisfactory for a high-power unit because batteries made up of a large number of cells (for example, in the order of a hundred cells) assembled in parallel generate very high electric currents to be transported by the interconnection circuits (up to 100 amps or even several hundred amps), which is not possible with the flexible circuits described. In addition, the material from which the flexible circuits are made (polyamide or polyester film) is very fragile and can be damaged by the friction of the support springs in the event of slight movements, which would result in a loss of electrical contact. Finally, the springs described in this document do not have sufficient travel and bearing force to ensure effective contact of the flexible contact strip on the cell terminals.

the cost of the flexible circuit is directly related to the surface area of same; it is conceivable that it would be very high if the technology proposed in this document were applied to the production of batteries made up of a large number of cells to be connected (very large surface area to be covered);

according to this document, the battery can no longer be dismantled after the cover has been closed by a sealing process.

In an application for the manufacture of batteries made up of a large number of cells, European Patent EP1450422 proposes to house these cells in a case open on both its sides and to connect them, in twos, by means of small connection plates welded on the opposite ends of the cells.

The disadvantage of this type of connection is that it requires cells suitable for welding and costly, bulky, and difficult-to-handle specialized tools to make the multiple solders. Another major disadvantage of this connection method is that the battery cannot be disassembled, for example, to replace one or more defective cells.

In addition, the small connection plates used in the device described in the above document are not pressed against the poles of the battery cells by individual pressure means, but by a collective pressure means made up of plates of resilient material, such as rubber plates inserted between the terminals of the connected cells and top and bottom cover plates. Such resilient plates do not make it possible to guarantee the continuity of electrical contact between the small connection plates and the cells, particularly in the event of weld breaks.

At the bridging between the connection electrode portion of one of the two adjacent batteries and the bottom of the battery housing of the other battery, a flat connection plate is connected by welding close to each of these so as to form a low-cost battery connection structure that allows the electrical resistance to be reduced by an easy process. Each battery storage part, which is distinctly square in plain view of a support housing made of synthetic resin, encloses cylindrical batteries whose axes are parallel, and both sides of the support housing are closed with covers provided with radiating holes so as to constitute a solid, vibration- and shock-resistant battery module. A plurality of battery modules are combined and fixed with shielding plates to form an integral body so as to constitute a battery pack.

The European Patent EP2008354 describes an alternative battery pack solution including:
a plurality of conductors, each conductor comprising a plurality of holes;
a plurality of batteries, wherein each of the batteries includes two terminals;
a plurality of fusible links.

For each of the batteries, one of the fusible links couples one of the conductors to one of the terminals of the battery, wherein the fusible link extends through one of the plurality of holes in the conductor.

Also known is document European Patent EP 2416405, which describes another example of a battery pack, or battery pack module, demonstrating improved performance, reliability and safety in the event of an impact in a single small region of the battery pack, this having a minor effect on its cost, complexity, weight and size. The module is designed such that a specific fusible interconnection associated with a single battery, or fusible interconnections associated with a single battery, is/are the last fuse(s) to blow in the event of a short circuit. The use of fast-erase interconnections minimizes the risk of sustained arcing for the predetermined interconnection(s). The present disclosure thus minimizes the risk of damage and overheating.

The solutions of the prior art are not entirely satisfactory because the electrical connection between the negative pole is made by pressing on a non-planar conductive surface, which can cause bad contacts, especially when the surface is not degreased or has deposits of dirt with poor conductivity, when the battery contacts are not perfectly conjugated with the flat conductive surfaces of the module.

Sometimes, as in European Patent EP 2034539, this electrical connection to the negative pole is established by resiliently deformable blades, in order to allow a spring effect and a deflection in relation to a zone forming a linear hinge.

This solution is not satisfactory either, as contact is only perfect when the surface of the blade is strictly adjacent to the surface of the negative pole, which only occasionally occurs with a resilient hinged blade.

A solution comprising a substrate portion made of a sheet material, a connection portion having a periphery defined by a first slit formed on the conductive sheet material and connected to the battery terminal, and a narrow fuse having a periphery defined by second slits formed on the conductive sheet material, continuously, to the first slit and having one end connected continuously to the substrate portion and the other end connected continuously to the connecting portion is also known in US Patent Application US2015/364744. An insulating film is fixed to a region comprising the fuse and the second slits defining the fuse and on the substrate portion and the connection portion.

US Patent Application US2017229208 describes another example of a busbar for connecting battery cells.

European Patent Application EP2697846 describes a storage unit for storing electrical energy, including at least one energy storage device having at least one positive terminal and at least one negative terminal. The energy accumulator is designed to be charged with electrical energy by means of the positive terminal and the negative terminal and to supply the electrical energy by means of the terminals. The storage unit has an electrically conductive contact rail connected to the positive terminal and an electrically conductive contact rail connected to the negative terminal. The contact rails each have at least one external terminal for the electrical connection of the storage unit.

BRIEF SUMMARY

In order to remedy these drawbacks, the present disclosure relates to a power unit made up of a weld-free assembly of a plurality of battery cells having positive and negative contact surfaces, respectively, on the two opposing end faces thereof, the cells being mechanically juxtaposed and parallel with one another, the unit including:
a bottom plate having metal contact zones capable of ensuring electrical connection with the bottom metal base of a battery cell;
a top plate having metal contact zones for ensuring electrical and optionally thermal connection with the top cap of a cell;
means for connecting with the top caps of the cells, which are resiliently deformable in an axial direction relative to the orientation of the cells.

The unit includes a conductive sheet having cut-outs defining resiliently deformable contacts having a planar central portion to ensure contact with the top cap of a corresponding cell, the planar central portion being movable relative to the plane of the intermediate plate in a displacement parallel to the plane, the planar central portion being urged toward the cell by a material resiliently deformable in a direction perpendicular to the plane, the material being housed between the bottom surface of the top plate and the planar central portion of the contact, the planar central portion being connected to a fixed portion of the conductive sheet by at least one connection arm.

The plates advantageously, but not exclusively, can be made up of printed circuits.

This solution allows the use of printed circuits as the plate and also allows direct integration of battery control components such as a BMS (battery management system), an electronic circuit controlling module functions, or solid-state contactors using transistors.

The assemblies can be used in series as well as in parallel or series-parallel and are therefore fully modular.

It is also possible to integrate fuse elements for each cell.

From a thermal point of view, the presence of conductive plates in strong contact with the cells allows optimal thermal management both in cooling and heating, thus allowing improved performance and longer cell life.

In addition, this thermal management can be very simply implemented by bringing the plate(s) into contact with a heat sink/cooler/cold plate or any other element allowing heat evacuation/cooling.

The technical effect is an improved electrical connection due to the displacement of the contact surface in a plane perpendicular to the axis, which makes it possible to maintain parallelism between the surface forming the positive pole, for example, and the connection element of the unit. Furthermore, this spiral-shaped configuration, whether or not accompanied by a resilient element, makes it possible to ensure a mechanical bearing force greater than that obtained with a deformable blade with respect to a linear hinge zone.

According to a preferred solution, the unit further includes a spacer plate adjoining the bottom surface of the top plate, said spacer plate comprising a conductive sheet having cutouts defining resiliently deformable contacts having a planar central portion for ensuring contact with the top cap of a corresponding cell, the planar central portion being movable relative to the plane of the intermediate plate in a displacement parallel to the plane, the planar central portion being urged toward the cell by a material resiliently deformable in a direction perpendicular to the plane, the material being accommodated between the bottom surface of the top plate and the planar central portion of the contact, the planar central portion being connected to a fixed portion of the conductive sheet by at least one connection arm.

Preferably, the arm has a spiral shape.

Alternatively, the planar central portion of the contact is connected to the fixed part by a plurality of tangential arms.

Advantageously, the intermediate plate is made up of a printed circuit comprising one, two, four or more metal layers separated by an insulator.

Preferably, the central parts have a plurality of metallized holes electrically connecting the metal layers at each contact.

According to an advantageous embodiment, part of the tracks of at least one of the printed circuits, or each contact, has a fusible zone between the metal layers of the central part and the metal layers of the zone of connection with the metal layers of the sheet.

According to a variant, the bottom plate is made of a metal sheet.

Preferably, the bottom plate is made up of a printed circuit comprising one, two, four or more metal layers separated by an insulator.

Advantageously, the contact zones of the bottom plate have a plurality of metallized holes electrically and thermally connecting the metal layers.

In a variant, the bottom plate and the top plate are joined mechanically and generally electrically by metal spacers.

According to another variant, the top plate is made of a multilayer printed circuit integrating an intelligent battery management circuit.

The top plate integrates the positive and negative electrical input/output connection points of the power unit. These advantageously distributed connection points allow the mechanical connection by screwing of busbars of large cross-section or by welding of electrical connection conductors.

BRIEF DESCRIPTION OF THE DRAWINGS

The present disclosure will be better understood by reading the following detailed description of a non-limiting example embodiments of the present disclosure, with reference to the drawings annexed hereto, in which.

DETAILED DESCRIPTION

General description of the power unit

Figure 1:
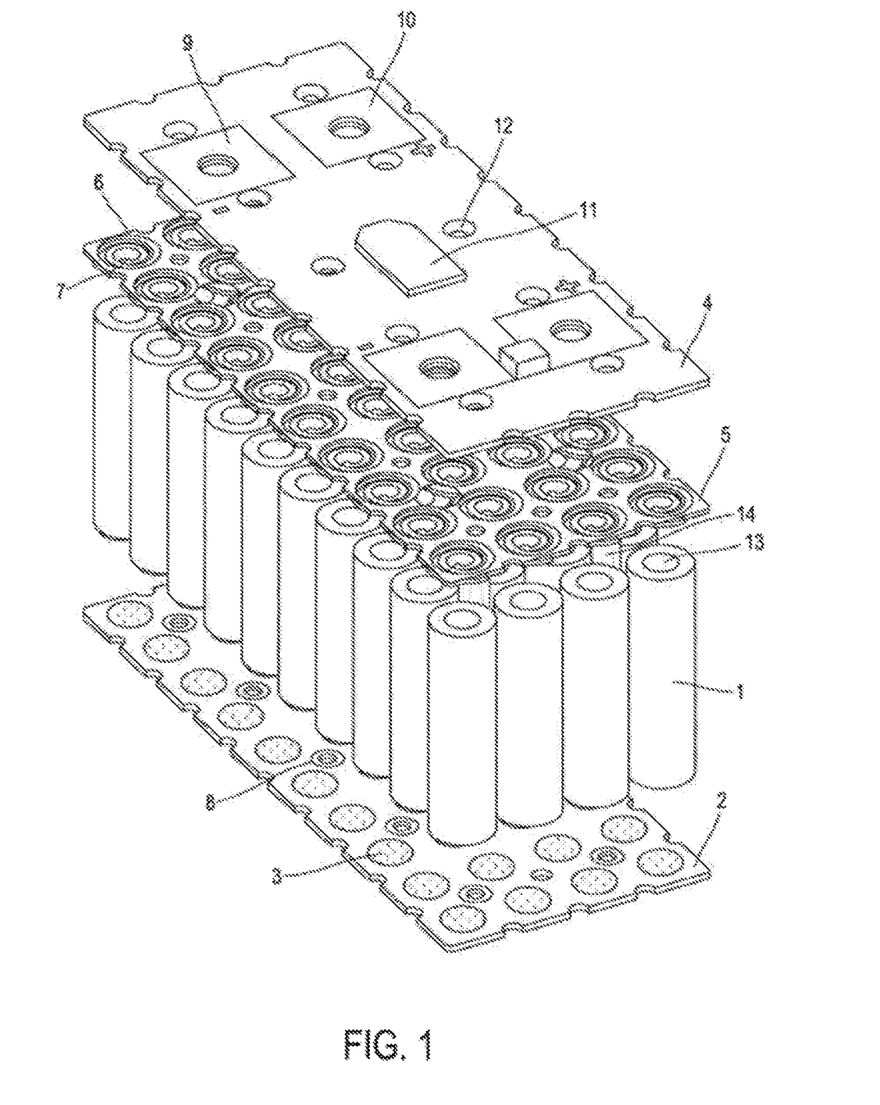
FIG. 1 shows an exploded view of a power unit according to the present disclosure.
Figure 4:
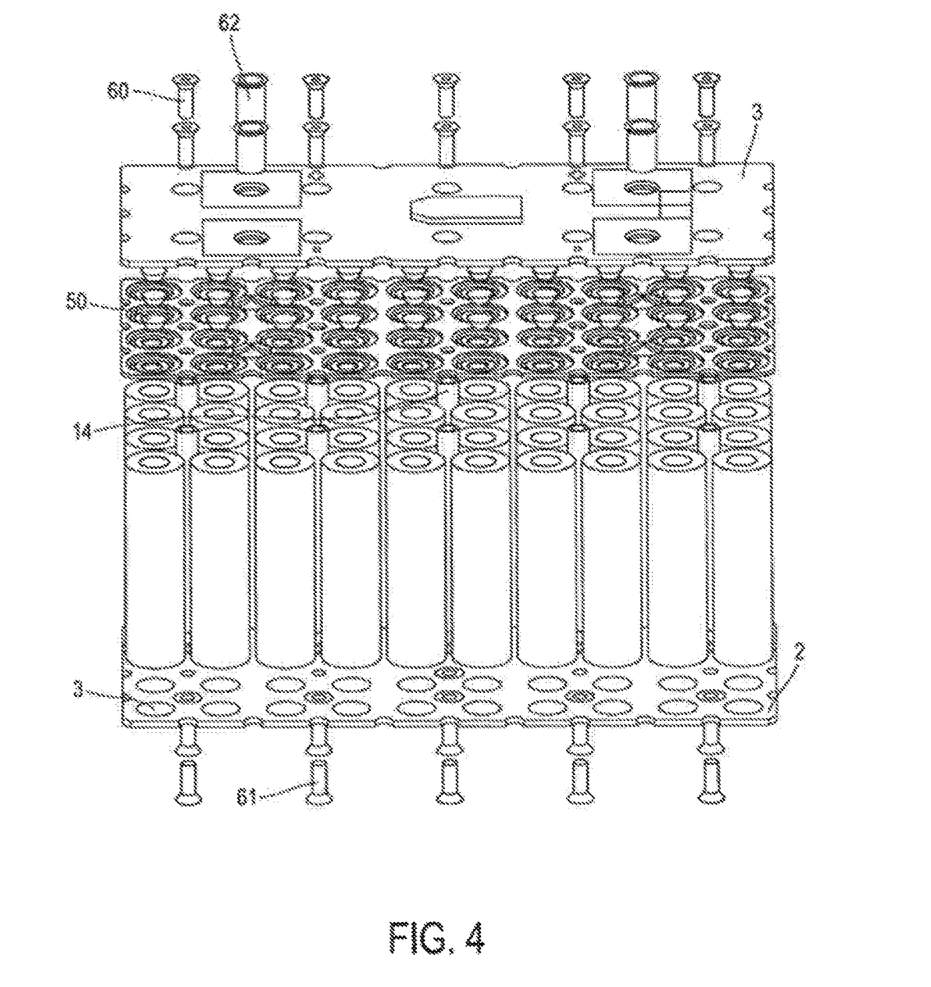
FIG. 4 represents another exploded view of a power unit according to the present disclosure.

The power unit shown in FIG. 1 and FIG. 4 includes:

- a set of battery cells (1) all oriented parallel to each other and in the same direction, with the metal cap forming the positive pole facing upwards and aligned to form a matrix of N rows and M columns;
- a bottom printed circuit (2), the top conductive surface (3) of which ensures the connection with the bottom metal cap constituting the negative pole of the batteries;
- a top printed circuit (4), the bottom surface of which ensures the connection, via an intermediate element (5), with the top metal cap constituting the positive pole of the batteries;
- an intermediate element (5) having cutouts (6) defining contact surfaces (7) ensuring the electrical and mechanical connection with the cap of the corresponding cell (1).

Detailed description of the bottom printed circuit (2)

The bottom printed circuit (2) has a number of functions:

A—it ensures the mechanical strength of the assembly, and has sufficient rigidity to avoid deformations;

B—it provides the interconnection between the negative poles of the battery cells (1) to produce a series, parallel or series-parallel assembly;

C—it ensures the electrical connection with the top printed circuit (4); and

D—it ensures the dissipation of the heat produced by the battery cells (1).

The bottom printed circuit is made up of two conductive layers separated by an insulating layer, and the outer surfaces of the conductive layers are coated with a lacquer. The number of layers and their thicknesses are defined depending on the electrical power to be transmitted.

The conductive layers are typically 0.1 millimeter thick copper layers, and the insulating layers are typically 0.28 millimeter thick laminates. Such printed circuits are known under the trade name FR4.

The connection between the copper layers is ensured by vias referred to as plated through holes (PTH) formed by metallized holes, according to a technique known in the art. These vias are evenly distributed on the bottom plate (2).

Each top conductive surface (3) has a plurality of vias to also ensure thermal conduction between the top metal surface coming into contact with the bottom of the battery cell, and the bottom metal surface, which conducts heat away by convection or conduction depending on its application. The inner surface of the bottom plate (2) is attached to a radiator to improve the thermal control of the power unit.

Depending on the type of assembly, the conductive layers are continuous or form interconnection tracks. When the battery cells are assembled in parallel, the conductive layers have no insulated zones.

The bottom plate (2) furthermore has milled and metallized holes (8) of larger diameter than the vias, for the passage of a conical-headed screw ensuring the connection with an aluminum spacer (14) connecting the bottom plate (2) to the top printed circuit (4) to form a rigid cage and to transmit the current from the bottom plate (2) to the top printed circuit (4) and possibly to ensure thermal conduction.

The assembly is achieved by screws (60, 61) engaged in the threads provided at the ends of the spacers (14).

Detailed description of the top printed circuit (4)

The top printed circuit (4) has a structure similar to that of the bottom printed circuit (2), with a different configuration of the metal layers, so as to form the current collection tracks corresponding to the positive poles and negative poles and so as to ensure the connection to the output terminals (9, 10). The conductor tracks are also etched to ensure the interconnection with a battery management system (BMS) circuit (11).

Similarly to the bottom printed circuit (2), vias (62) connect the various conductive layers of the top printed circuit (4), and metallized countersunk holes (12) receive the conical screw heads ensuring the fixing of the spacers (14).

Detailed Description of the Intermediate Element (5)

The caps (13) of the cells (1) do not come into direct contact with the bottom conductive surface of the top printed circuit (4).

An intermediate element (5) is interposed between the top printed circuit (4) and the battery cells (1).

This plate is formed in the example described by a double-layer printed circuit, having a top copper conductive surface and a bottom copper conductive surface separated by an insulator. The outer surfaces are coated with a lacquer, which is removed at the contact surfaces.

Figure 2:
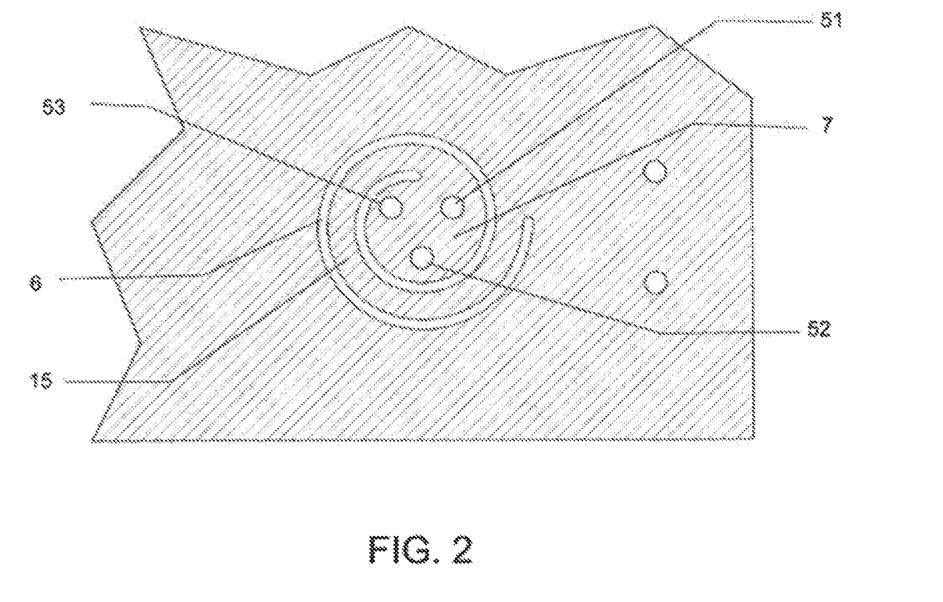
FIG. 2 shows a detailed view of the intermediate plate from below.
Figure 3:
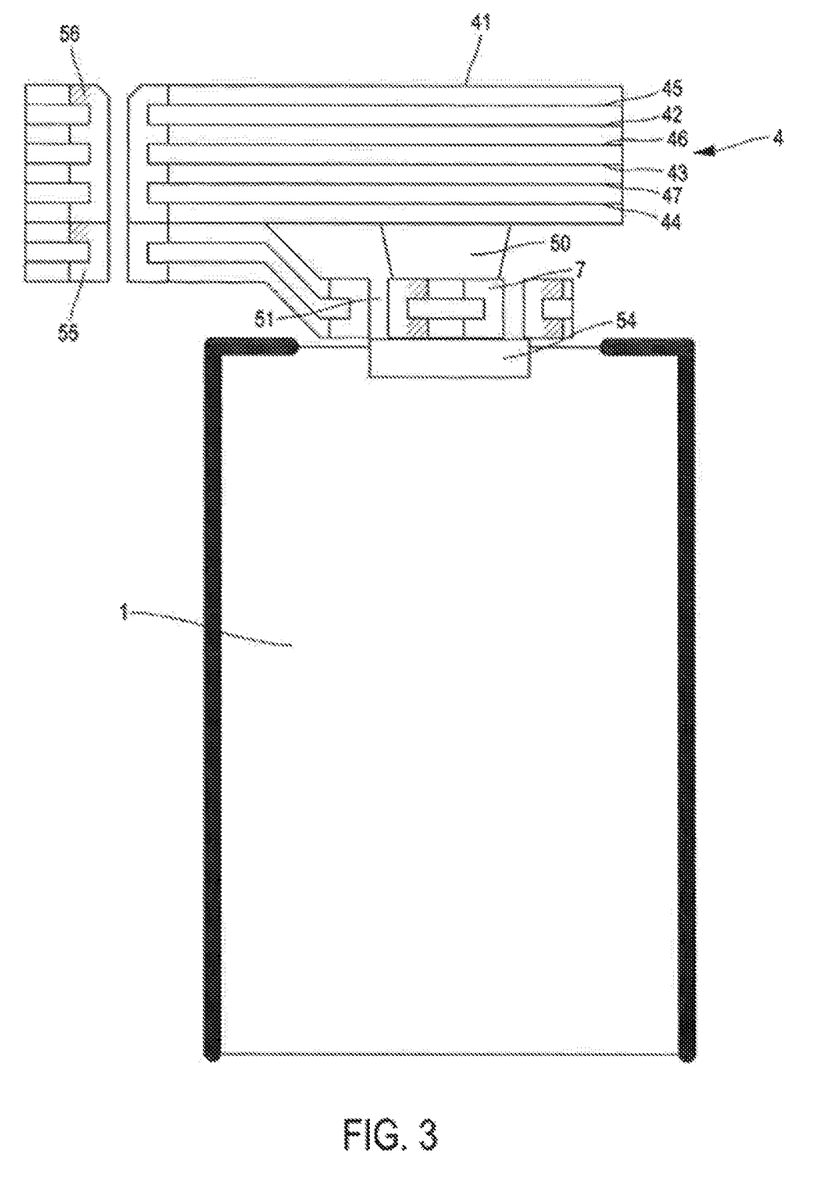
FIG. 3 shows a detailed cross-sectional view of the intermediate plate.

FIGS. 2 and 3 show bottom and cross-sectional views, respectively, of one of the intermediate circuit contact zones. The cutout (6) has a spiral shape and defines a curved arm (15) terminating in a substantially disc-shaped contact surface (7). The arm extends over at least 180° and preferably at least 270° so as to allow a deflection of the contact surface (7) in a direction perpendicular to the plane of the printed circuit (5), remaining substantially parallel to this plane throughout the movement.

In the example described with reference to FIG. 3, the top printed circuit (4) has four conductive layers (41 to 44) and three insulating layers (45 to 47).

The conductive layers (41 to 44) are regularly connected by a via (47).

The spacer printed circuit (5) has contact surface (7), which are pressed downwards by a resiliently deformable material (50), for example, an elastomer cup.

By way of example, the movement is about 2 mm and the contact force is about 70N.

There are two conductive tracks separated by an insulating layer. Vias (51 to 53) pass through the contact zone to allow the passage of high currents between the cap (54) of the battery cell (1) and the intermediate printed circuit (5).

The electrical connection between the top printed circuit (4) and the intermediate printed circuit (5) is achieved by vias (55 to 56) passing through all the layers of the two circuits and in mutual contact.

Other Features

The unit may include spacers formed by a rigid sheet having apertures of which the cross-section and arrangement correspond to the positioning of the batteries.

These spacers ensure that the batteries are held and wedged in place by means of the apertures in which the cylindrical cells of the battery are housed without any significant play.

Thanks to this arrangement, a cooling air circulation is obtained along and around the battery cells (1) while keeping them positioned without significant play. This result is important, due to the fact that during charging and discharging of the cells of the battery, particularly during use at high specific power, a rise in temperature occurs in the storage cells, and it is highly desirable to balance this rise in temperature between the cells, inside the battery, and to reduce it.

The invention claimed is:

1. A power unit, comprising a weld-free assembly of a plurality of battery cells having positive and negative contact surfaces, respectively, on two opposing end faces thereof, the cells being mechanically juxtaposed and parallel with one another, the unit including:
    a bottom plate having metal contact zones capable of ensuring electrical connection with a bottom metal base of a cell;
    a top plate having metal contact zones for ensuring electrical connection with a top cap of a cell; and
    a connection element configured to promote a connection between the metal contact zones and the top caps of the cells, the connection element being resiliently deformable in an axial direction relative to the orientation of the cells,
    wherein the unit includes a conductive sheet having cut-outs defining resiliently deformable contacts having a planar central portion to ensure contact with the top cap of a corresponding cell, the planar central portion being movable relative to a plane of an intermediate element in a displacement parallel to the plane, the planar central portion being urged toward the cell by a material resiliently deformable in a direction perpendicular to the plane, the material being housed between a bottom surface of the top plate and the planar central portion of the contact, the planar central portion being connected to a fixed portion of the conductive sheet by at least one connection arm.

2. The power unit according to claim 1, wherein the unit further includes a spacer plate adjoining the bottom surface of the top plate, the spacer plate comprising the conductive sheet of claim 1, wherein the planar central portion of the conductive sheet is movable relative to a plane of the spacer plate in a displacement parallel to the plane of the spacer plate, the planar central portion being urged toward the cell by the material resiliently deformable in a direction perpendicular to the plane of the spacer plate.

3. The power unit according to claim 2, wherein the at least one connection arm has a spiral shape.

4. The power unit according to claim 2, wherein the planar central portion of the contact is connected to a fixed part by a plurality of tangential arms.

5. The power unit according to claim 2, wherein the intermediate element comprises a printed circuit including a plurality of metal layers separated by an insulator.

6. The power unit according to claim 5, wherein the central portions have a plurality of metallized holes electrically connecting the metal layers at each contact.

7. The power unit according to claim 5, wherein each contact has a fusible zone.

8. The power unit according to claim 5, further comprising a fusible zone between the metal layers of the central portion and the metal layers of a zone of connection with the metal layers of the sheet.

9. The power unit according to claim 5, wherein a portion of tracks of at least one of the printed circuits has a fusible zone.

10. The power unit according to claim 5, wherein the bottom plate comprises a printed circuit, a metal sheet, or a second conductive sheet.

11. The power unit according to claim 5, wherein the bottom plate comprises a printed circuit including at least two metal layers separated by an insulator.

12. The power unit according to claim 11, wherein the contact zones of the bottom plate have a plurality of metallized holes electrically connecting the metal layers.

13. The power unit according to claim 12, wherein the bottom plate and the top plate are mechanically and electrically connected by metal spacers.

14. The power unit according to claim 13, wherein the bottom plate and/or the top plate comprises a multilayer printed circuit integrating an intelligent battery management circuit or another electronic circuit.

15. The power unit according to claim 1, wherein the at least one connection arm has a spiral shape.

16. The power unit according to claim 1, wherein the planar central portion of the contact is connected to a fixed part by a plurality of tangential arms.

17. The power unit according to claim 1, wherein the central portions have a plurality of metallized holes electrically connecting a plurality of metal layers at each contact.

18. The power unit according to claim 1, wherein each contact has a fusible zone.

19. The power unit according to claim 1, wherein the bottom plate comprises a printed circuit, a metal sheet, or a second conductive sheet.

20. The power unit according to claim 1, wherein the bottom plate comprises a printed circuit including at least two metal layers separated by an insulator.

* * * * *